(12) United States Patent
Liu et al.

(10) Patent No.: US 7,754,650 B2
(45) Date of Patent: Jul. 13, 2010

(54) TRIFUNCTIONAL CATALYST FOR SULPHUR TRANSFER, DENITROGENATION AND COMBUSTION PROMOTING AND A METHOD FOR PREPARING THE SAME

(75) Inventors: Zhenyi Liu, Beijing (CN); Xiaowei Li, Beijing (CN); Hua Chen, Beijing (CN); Youcheng Liu, Beijing (CN)

(73) Assignee: Beijing SJ Environmental Protection and New Material Co., Ltd., Haidian District, Beijing (CN)

( * ) Notice: Subject to any disclaimer, the term of this patent is extended or adjusted under 35 U.S.C. 154(b) by 1153 days.

(21) Appl. No.: 10/985,147

(22) Filed: Nov. 10, 2004

(65) Prior Publication Data

US 2006/0100096 A1 May 11, 2006

(51) Int. Cl.
*B01J 23/10* (2006.01)
*B01J 23/58* (2006.01)
*B01J 23/22* (2006.01)

(52) U.S. Cl. .................. 502/304; 502/312; 502/330; 502/340; 502/341; 502/349; 502/524; 423/263; 423/636

(58) Field of Classification Search .............. 502/330, 502/304, 312, 340, 341, 524, 349; 423/263, 423/636
See application file for complete search history.

(56) References Cited

U.S. PATENT DOCUMENTS

| | | | | |
|---|---|---|---|---|
| 4,690,806 A * | 9/1987 | Schorfheide | ............... | 423/230 |
| 5,108,979 A | 4/1992 | Magnabosco et al. | | |
| 5,324,416 A * | 6/1994 | Cormier et al. | ............. | 208/113 |
| 5,393,722 A * | 2/1995 | Holmgren | ................... | 502/327 |
| 5,422,332 A | 6/1995 | Demmel | | |
| 5,426,083 A * | 6/1995 | Bhattacharyya et al. | ...... | 502/411 |
| 5,503,814 A | 4/1996 | Demmel | | |
| 5,618,406 A | 4/1997 | Demmel | | |
| 6,524,996 B1 * | 2/2003 | Bender et al. | ............... | 502/346 |

OTHER PUBLICATIONS

David Barthelmy "Bastnasite-(Ce) Mineral Data", <http://www.webmineral.com/data/Bastnasite-(Ce).shtml>.*
David Barthelmy "Bastnasite-(La) Mineral Data", <http://www.webmineral.com/data/Bastnasite-(La).shtml>.*

* cited by examiner

*Primary Examiner*—Timothy C Vanoy
*Assistant Examiner*—Diana J Liao
(74) *Attorney, Agent, or Firm*—Kaplan Gilman & Pergament LLP

(57) ABSTRACT

The present invention relates to a trifunctional catalyst used in catalytic cracking device in petroleum refining industry and a method for preparing the same. The trifunctional catalyst of the invention comprises absorbent, cerium dioxide and vanadium pentoxide acting as oxidative catalyst and cerium oxyfluoride acting as structural promoter. The oxidative catalyst and structural promoter are dispersed over the absorbent. The absorbent is spinel-based composite oxides having a general formula of $MgAl_{2-x}Fe_xO_4 \cdot yMgO$, where the x is 0.01-0.5 and y is 0.2-1.2. In the trifunctional catalyst, the raw material for forming the chemical compound containing rare-earth cerium is hamartite powder. The method for preparing the trifunctional catalyst of the invention is shown as follows: the components relating to the preparation of the finished product are dissolved or dispersed into liquid materials; then the trifunctional catalyst is obtained after the mixing, drying and calcining of such liquid materials. The trifunctional catalyst of the invention is used for highly efficient absorption and desorption of sulfoxides contained in the catalytic cracking flue gas regenerated in the process of petroleum refining, the combustion promoting of carbon monoxide and the reduction of nitrogen oxides. Furthermore, the method for preparing such trifunctional catalyst is featured for its lower cost.

18 Claims, 2 Drawing Sheets

TRIFUNCTIONAL CATALYST FOR SULPHUR TRANSFER, DENITROGENATION AND COMBUSTION PROMOTING AND A METHOD FOR PREPARING THE SAME

BACKGROUND OF THE INVENTION

The present invention relates to a trifunctional catalyst used in catalytic cracking process in petroleum refining industry and a method for preparing the same. More specially, said agent is used for transferring the sulfoxides from catalytic cracking flue gas, for the combustion promoting of carbon monoxide and for the reduction of nitrogen oxides.

DESCRIPTION OF BACKGROUND ART

The process of fluid catalytic cracking (FCC) is one of the most important secondary processing means in petroleum refining industry and an import source of light oil products. However, the flue gas discharged to the atmosphere in said process of fluid catalytic cracking (FCC) contains substantive noxious gases such as NOx, SOx and CO, etc. The SOx discharged from such process is one of the major sources of SOx contained in the atmosphere, accounting for 3%-4% of the total amount of SOx discharged to the atmosphere in the entire human life. The process of catalytic cracking is one of the important means for secondary processing of heavy oil in China. At present, the total processing capacity of catalytic cracking accounts for more than one-third of the crude oil processing capacity. With the raw materials for catalytic cracking getting more and more weighty and inferior in quality, the contents of impurities such as Sulphur and Nitrogen in the raw materials are increasing continuously. As a result, the events of corrosion cracking of regeneration systems and equipment have happened in many refineries, exerting serious threaten on their safety production. At present, it is universally accepted that, under the operational condition of oxygen enrichment regeneration, such acidic gases as NOx and SOx, which are generated in the process of catalyst regeneration, will penetrate through the wear resistant lining for heat insulation of the equipment and reach the metallic inner wall of the equipment, and then they will react with the water vapor contained in the fume so as to generate an acidic solution on the vessel wall through condensating, thus causing the erosion of equipment. To solve the above problem, extensive efforts have been made for reducing the content of such acidic gases as NOx and SOx in regenerated flue gas. To remove the sulfoxides contained in regenerator fumes, it is general to use the sulphur transfer agent for conducting oxidation adsorption of them. The sulphur transfer agent for absorbing the sulfoxides enters the riser reactor along with the regenerated cracking catalyst; such sulphur transfer agent will be regenerated under the reducing condition in the riser reactor; the regenerated sulphur transfer agent, along with the cracking catalyst, enters the regenerator for duty-cycle operation. According to related research, the sulphur transfer agent can be divided into two categories, i.e., the solid sulphur transfer agent and the liquid sulphur transfer agent. In view of the research and development of sulphur transfer agents both abroad and home, nearly all of the commercial sulphur transfer agents contain Vanadium, because Vanadium has a unique catalytic effect on the oxidation-reduction reaction of sulphur. However, Vanadium has a toxic effect on the FCC catalyst (or catalytic cracking catalyst, hereinafter referred as cracking catalyst) and the liquid sulphur transfer agent will strengthen such toxic effect due to its high dispersibility. Consequently, the solid sulphur transfer agent will be the major development direction in this field. Before 1980s, the selection of sulphur transfer agent started from the metal oxide. At the very beginning, $Al_2O_3$, MgO or their mixtures were adopted as sulphur transfer agent, but their performances were not satisfactory. $Al_2(SO_4)_3$ has thermal instability at high temperature; although MgO has good desulphurizing ability and its sulfate $MgSO_4$ also has good thermal stability, its regeneration effect is not satisfactory. In the middle of 1980s, because the unique sulfur absorption property and desorption property of spinel were found, the direction in the research on sulphur transfer agents was turned to spinel or spinel-based (mainly including solid solution spinel, which is rich in MgO) series. In the recent years, the direction in the research on sulphur transfer agent is how to enable the spinel to possess better desulfuration and regeneration property. U.S. Pat. No. 5,108,979 has disclosed that at the meantime when the spinel or spinel-based structure is formed, the sulphur transfer agent for cerium dioxide and vanadium pentoxide can be generated. However, this document does not provide the parameters regarding desulfuration and regeneration property, and the cost of sulphur transfer agent obtained according to its embodiments is relatively high. In some other documents, it is also disclosed that some sulphur transfer agents have such functions as nitrogen reducing and combustion promoting, but no specific chemical formulas or structural formulas of these sulphur transfer agents have been provided.

SUMMARY OF THE INVENTION

Therefore, an object of the present invention is to provide a trifunctional catalyst for sulphur transfer, denitrogenation and combustion promoting, which can very effectively reduce the contents of sulfoxides, nitrogen oxides and carbon monoxide in the catalytic cracking flue gases, as well as a method for preparing said trifunctional catalyst in lower cost.

The trifunctional catalyst for sulphur transfer, denitrogenation and combustion promoting provided by the present invention comprises absorbent and oxidative catalyst. Said oxidative catalyst is dispersed over said absorbent. Said oxidative catalyst comprises vanadium pentoxide and cerium dioxide containing rare-earth cerium, characterized in that: said oxidative catalyst also has a structural promoter dispersed over said absorbent, which is cerium oxyfluoride, a chemical compound containing rare-earth cerium; said absorbent is a spinel-based composite oxide having a general formula $AB_{2-x}B'_xO_4 \cdot yAO$, where A represents the alkaline-earth element Mg of periodic table of elements, B represents group IIIA metallic element Al, B' represents transition metallic element Fe, x represents 0.01-0.5, preferably 0.05-0.4, more preferably 0.05-0.20, y represents 0.2-1.2, preferably 0.4-1.2, more preferably 0.8-1.0.

The components of said absorbent include $MgAl_{1.99}Fe_{0.01}O_4 \cdot MgO$, $MgAl_{1.95}Fe_{0.05}O_4 \cdot MgO$, $MgAl_{1.90}Fe_{0.10}O_4 \cdot MgO$, $MgAl_{1.85}Fe_{0.15}O_4 \cdot MgO$, $MgAl_{1.80}Fe_{0.20}O_4 \cdot MgO$, $MgAl_{1.60}Fe_{0.40}O_4 \cdot MgO$, $MgAl_{1.80}Fe_{0.20}O_4 \cdot 0.4MgO$, $MgAl_{1.80}Fe_{0.20}O_4 \cdot 0.6MgO$, $MgAl_{1.80}Fe_{0.20}O_4 \cdot 0.8MgO$, $MgAl_{1.80}Fe_{0.20}O_4 \cdot 1.0MgO$ or $MgAl_{1.80}Fe_{0.20}O_4 \cdot 1.2MgO$.

In said trifunctional catalyst, the chemical compound containing rare-earth cerium accounts for a weight percentage of 20%-35%; the vanadium pentoxide in the oxidative catalyst accounts for a weight percentage of 2%-4% in said trifunctional catalyst; the rest is absorbent.

In said trifunctional catalyst the raw material for forming the chemical compound containing rare-earth cerium is hamartite powder. The raw material for forming the vanadium pentoxide in the oxidative catalyst is ammonium metavanadate.

The method of the present invention for preparing the trifunctional catalyst for sulphur transfer, denitrogenation and combustion promoting, wherein the trifunctional catalyst for sulphur transfer, denitrogenation and combustion promoting comprises absorbent, oxidative catalyst and structural promoter dispersed over said absorbent; said oxidative catalyst comprises cerium dioxide containing rare-earth cerium and vanadium pentoxide; said structural promoter is cerium oxyfluoride (also a chemical compound containing rare-earth cerium); said absorbent is a spinel-based composite oxides having a general formula of $AB_{2-x}B'_xO_4 \cdot yAO$, where A represents the alkaline-earth element Mg of periodic table of elements, B represents group IIIA metallic element Al, B' represents transition metallic element Fe, x represents 0.01-0.5, y represents 0.2-1.2; this method include the following steps: 1) stirring and mixing said hamartite powder with water, so as to obtain the suspension of hamartite powder for ready-use; mixing the ammonium metavanadate with water and organic acid, so as to obtain the organic acid water solution of ammonium metavanadate for ready-use; stirring the hydrate of alumina with water and monoprotonic acid, so as to obtain aluminum hydroxide gel for ready-use; stirring the light magnesium oxide with water and monoprotonic acid, so as to obtain the slurry of magnesium salt for ready-use; stirring the light magnesium oxide with water, so as to obtain the slurry of magnesium hydroxide for ready-use; dissolving the ferric iron salt in water, so as to obtain the water solution of ferric iron for ready-use; wherein the dosage of hamartite powder is so determined as the chemical compounds containing the rare-earth cerium in the finished product accounting for 20%-35% of the total weight of the finished product; the dosage of ammonium metavanadate is so determined as the vanadium pentoxide in the finished product accounting for 2%-4% of the total weight of the finished product; the dosage of hydrate of alumina, light magnesium oxide and ferric iron salt is so determined as the required chemical composition of $AB_{2-x}B'_xO_4 \cdot yAO$ and the absorbent in the finished product accounting for 61%-78% of the total weight of the finished product; 2) mixing the aluminum hydroxide gel, the slurry of magnesium salt, the slurry of magnesium hydroxide, the suspension of hamartite powder, organic acid solution of ammonium metavanadate and the solution of ferric iron salt obtained in step 1), so as to obtain a mixed liquor; 3) drying said mixed liquor, so as to obtain the semi-finished product; 4) calcining the semi-finished product at the temperature of 400~800° C. for 1-2 hours, so as to obtain the finished product.

In the hamartite powder of step 1), the content of hamartite with a chemical formula $(Ce, La)(CO_3)F$ is ≧93% (at weight); the content of the rare-earth oxide included in said hamartite powder is ≧70% (at weight), and the rare-earth element composition in the rare earth oxide is Ce>>La, i.e., the Ce content greatly higher than the La content, Ce≧45% (at weight). The organic acid mixed with ammonium metavanadate in step 1) is oxalic acid, and the lower limit of the dosage of oxalic acid is so determined as the ammonium metavanadate is entirely dissolved in water.

In said step 1), the hydrate of alumina is preferably pseudo-boehmite, and, through the reaction occurred between pseudo-boehmite and monoprotonic acid, a aluminum hydroxide gel having gel solution acid value of 2-6 (the millimole number of monoprotonic acid corresponding to each grams of alumina $Al_2O_3$ in the system) and solid content of 15%-25% (at weight) is obtained, wherein the gelatinization ratio of pseudo-boehmite is ≧95%, the content of $Al_2O_3 \cdot H_2O$ in said pseudo-boehmite is ≧70% (at weight), and said monoprotonic acid is nitric acid or acetic acid. When the pseudo-boehmite and monoprotonic acid are mixed, the stirring rate reaches 300-600 revolutions per minute. Preferably, the monoprotonic acid is nitric acid with gel solution acid value of 3-5.

As for the light magnesium oxide used for preparing said slurry of magnesium salt and said slurry of magnesium hydroxide in said step 1), the specific surface area is ≧100 $m^2/g$, and the content of MgO≧95% (at weight); the monoprotonic acid used for preparing the slurry of magnesium salt is acetic acid and/or nitric acid; the dosage of acetic acid and/or nitric acid is determined according to the mole ratio for its sufficient reaction with MgO; the solid content of the slurry of magnesium salt and the slurry of magnesium hydroxide is 10%-14% (at weight). To prepare said slurry of magnesium salt, said light magnesium oxide is at first stirred with water evenly and then glacial acetic acid and/or nitric acid is added to magnesia for sufficient reaction, so as to produce magnesium acetate and/or magnesium nitrate; when said glacial acetic acid and/or nitric acid is reacting with magnesia, the stirring rate reaches 300-600 revolutions per minute. The ferric iron salt used in step 1) is preferably ferric nitrate.

When the mixing operation is performed in step 2), the stirring rate reaches 300-600 revolutions per minute.

The drying process in said step 3) is spray drying, with tower top temperature of 300-350° C., pressure of 3.0-5.0 Mpa, evaporation capacity of 50-150 kg/h, and the content of the part of the semi-finished product with particle size distribution within the range of 80~120 μm≧80% (at weight).

The drying process in said step 3) can also be oven drying, with temperature of 100-150° C.

The calcining process in said step 4) adopts the method of slow heating-up, with preferred calcining temperature of 400-500° C. and preferred calcining time of 80-100 minutes.

When the trifunctional catalyst for sulphur transfer, denitrogenation and combustion promoting of the present invention is used in the catalytic cracking technology of petroleum refining industry, the spent cracking catalyst (to be regenerated), which enters the regenerators and has accumulated/deposited thereon with hard cokes, contains a certain quantity of sulphur oxides and nitrogen oxides. The spent cracking catalysts (coked catalysts) come in contact with air coming from the bottom of the regenerator, so as to form a fluidized bed layer for regeneration reaction. The sulphur contained therein reacts with oxygen gas in the air so as to generate sulfur dioxide, and the carbon contained therein reacts with oxygen gas so as to generate carbon monoxide. Under the catalytic effect of the vanadium pentoxide and cerium dioxide contained in the trifunctional catalyst of the present invention, the sulfur dioxide will react with the oxygen gas so as to generate sulfur trioxide. The cerium dioxide not only catalyzes the oxidation of sulfur dioxide, but also catalyzes the oxidation of carbon monoxide. In the catalytic process, the cerium dioxide respectively oxidizes the sulfur dioxide and carbon monoxide into sulfur trioxide and carbon dioxide and itself is reduced into cerous oxide, thus achieving the sulphur-reduction and combustion promoting. At this time, the cerous oxide is oxidized because of its reducibility. When most of the cerous oxide is oxidized into cerium dioxide by the oxygen gas, a part of cerous oxide makes the nitrogen oxide reduced to nitrogen gas and itself is oxidized to cerium dioxide, thus achieving the Nitrogen-reduction. The nitrogen gas and carbon dioxide are discharged as part of the flue gas, and the generated sulfur trioxide is absorbed by the adsorbent contained in the trifunctional catalyst of the present invention, and reacts with the magnesium oxide contained therein so as to generate the magnesium sulfate. In this way, the trifunctional catalyst of the present invention exerts effective catalytic oxidation and adsorption on the sulfur dioxide contained in the flue gas. When the trifunctional catalyst of the present invention enters the riser reactor along with the regenerated cracking catalyst, the magnesium sulfate contained in the trifunctional catalyst will react with the hydrogen gas so as to generate the magnesium oxide and hydrogen sulfide, then the hydrogen sulfide will enter the next procedure along with the reaction oil gas. The generation of the magnesium oxide enable the regeneration of the adsorbent contained in the trifunctional catalyst of the present invention, and the regenerated trifunctional catalyst will enter the regenerator along with the cracking catalyst for duty-cycle operation. The related reaction equations are shown as follows:

$$S(\text{in coke}) + O_2 = SO_2 \quad (1)$$

$$2SO_2 + O_2 = 2SO_3 \quad (2)$$

$$SO_3 + MgO = MgSO_4 \quad (3)$$

When the trifunctional catalyst having adsorbed the sulfoxides enters the reactor, the following reactions will happen so that $H_2S$ will be released and the trifunctional catalyst itself will be regenerated.

$$MgSO_4 + 4H_2 = MgO + H_2S + 3H_2O \quad (4)$$

$$MgSO_4 + 4H_2 = MgS + 4H_2O \quad (5)$$

In the stripping section, because of the participation of water vapor, there is also the following reaction:

$$MgS + H_2O = MgO + H_2S \quad (6)$$

The cerium dioxide contained in the trifunctional catalyst may be reduced into cerous oxide by the sulfur dioxide and carbon monoxide:

$$2CeO_2 + SO_2 = Ce_2O_3 + SO_3 \quad (7)$$

$$2CeO_2 + CO = Ce_2O_3 + CO_2 \quad (8)$$

The tervalent cerium oxide can be oxidized by nitrogen oxide or oxygen into tetravalent cerium:

$$2Ce_2O_3 + NO = 4CeO_2 + N_2 \quad (9)$$

$$2Ce_2O_3 + O_2 = 4Ce_2O_3 \quad (10)$$

The present invention has the following positive effects: (1) The adsorbent with MgO enrichment spinel-based structure adopted by the present invention has good desulphurizing ability and can be effectively regenerated. Because the mutual interaction between MgO and $V_2O_5$ can generate $(MgO)_3V_2O_8$, the adsorbent of the present invention has very strong ability for capturing Vanadium, thereby suppressing the toxic action of Vanadium on the cracking catalyst. (2) The present invention adopts the hamartite powder as the raw material for providing cerium compound catalyst. Because of the spinel-based structure, cerium oxyfluoride and cerium dioxide are generated at the same time, the content of MgO contained in spinel-based can be increased, so that the content of MgO can be 400% surplus and MgO can not be dissociated, thus greatly increasing the reactivity of the product for sulphur transfer. Furthermore, using the hamartite powder as raw material also reduces the production costs of the product. (3) The transition element Fe is introduced in the adsorbent of the trifunctional catalyst of the present invention. As a result, distortion of lattice occurs in the spinel structure, which greatly increases the desulphurizing ability of the product. (4) According to the related experiments, when the tri functional catalyst of the present invention is applied, the rate of removing the SOx in the flue gas of the first regenerator is $\geqq 60\%$, the rate of removing SOx in the flue gas of the second regenerator is $\geqq 80\%$, the average content of SOx in the flue gas of the second regenerator is $\leqq 5$ mg/m³, the rate of removing NOx in the flue gas of the second regenerator is $\geqq 90\%$, the combustion promoting effect on the carbon monoxide is obvious, and the platinum combustion improver is no longer needed. (5) When the trifunctional catalyst of the present invention is applied, the acid dew point temperature of the flue gas falls. The acid dew point temperature of the secondary flue gas falls from 122° C. to $\leqq 60°$ C. At the same time, the pH value of the condensate in the secondary flue gas remarkably increases from 2 to 5.4 more or less; because the content of corrosive materials contained in the flue gas is decreased, the environment for generating nitrate stress corrosion cracking is eliminated, thus suppressing the crack of the regenerator. (6) The application of the trifunctional catalyst of the present invention has no significant effects on the distribution of the catalytic cracking products and the major quality index of the products. Furthermore, when the trifunctional catalyst is applied, the pollution discharge amount is remarkably dropped.

DETAILED DESCRIPTION OF THE INVENTION

Figure 1:
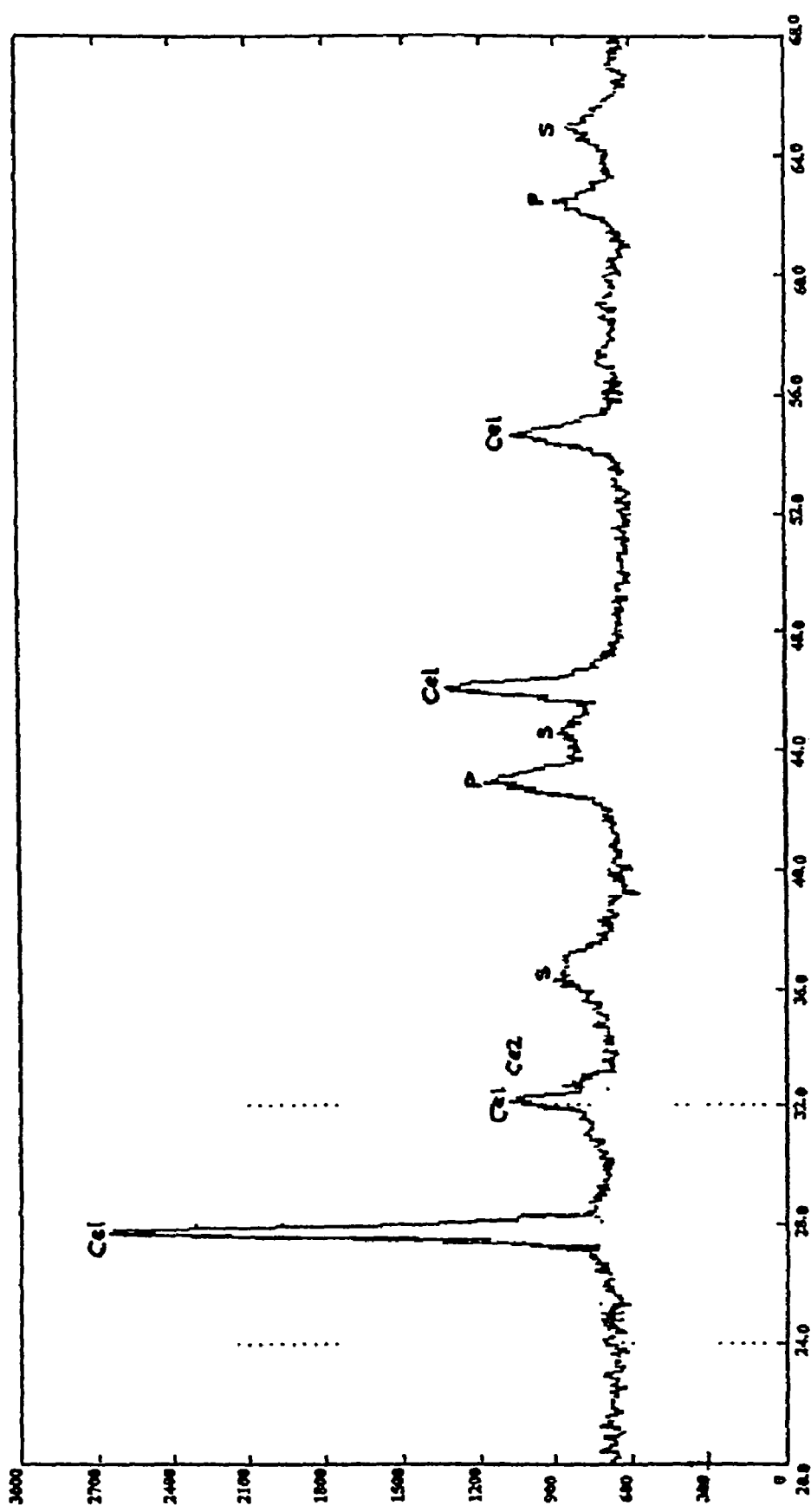
FIG. 1 is the X-ray diffraction pattern of the trifunctional catalyst of the present invention before adsorbing SOx, where Ce1 represents the eutectic crystal of the cerium dioxide and the cerium oxyfluoride, P represents the magnesium oxide, and S represents the spinel.

The method for preparing the trifunctional catalyst is illustrated with the following embodiments. However, the method is not limited to these embodiments.

Example 1

99.84 grams of water, 3.73 grams of glacial acetic acid and 18.28 grams of pseudo-boehmite are successively put into the stirring kettle, then the resultant mixture is stirred at high speed of 400 revolutions per minute for 30 minutes, so as to obtain the alumina gel A (herein also called aluminum hydroxide gel A). 26.88 grams of water and 6.17 grams of light magnesium oxide are successively put into the stirring kettle, then the mixture is evenly stirred for about 5 minutes, and then 18.37 grams of glacial acetic acid is slowly put into the mixture, and then the mixture is stirred at high speed of 400 revolutions per minute for 30 minutes, so as to obtain the magnesium slurry M1. 45.26 grams of water and 6.17 grams of light magnesium oxide are successively put into the stirring kettle, and then the mixture is evenly stirred, so as to obtain the magnesium slurry M2. 50% water solution is prepared respectively from 0.615 grams of $Fe(NO_3)_3 \cdot 9H_2O$ and 12 grams of hamartite powder. 1.029 grams of ammonium metavanadate is put into water with about 9 times of its weight, and then oxalic acid is gradually put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 400 revolutions per minute for 30 minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.99}Fe_{0.01}O_4 \cdot MgO$, the $CeO_2$ and $V_2O_5$ acting as oxidation catalyst are dispersed over the adsorbent, and the CeFO acting as structural promoter is also dispersed over the adsorbent.

Example 2

97.22 grams of water, 3.63 grams of glacial acetic acid and 17.80 grams of pseudo-boehmite are successively put into the stirring kettle, then the resultant mixture is stirred at high speed of 350 revolutions per minute for 30 minutes, so as to obtain alumina gel A. 26.71 grams of water and 6.13 grams of light magnesium oxide are successively put into the stirring kettle, then the mixture is evenly stirred for about 5 minutes, and then 18.26 grams of glacial acetic acid is slowly put into the mixture, and then the mixture is stirred at high speed of 350 revolutions per minute for 30 minutes, so as to obtain the magnesium slurry M1. 44.97 grams of water and 6.13 grams of light magnesium oxide are successively put into the stirring kettle, and then the mixture is evenly stirred, so as to obtain the magnesium slurry M2. 50% water solution is prepared respectively from 3.073 grams of $Fe(NO_3)_3 \cdot 9H_2O$ and 12 grams of hamartite powder into. 1.029 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 minutes. The obtained slurry is dried at the temperature of 120° C., and then calcined at the temperature of 500° C. for 80 minutes, so as to obtain the finished product of the trifunctional catalyst. In the trifunctional catalyst produced after calcining, the adsorbent component is $MgAl_{1.95}Fe_{0.05}O_4 \cdot MgO$, the $CeO_2$ and $V_2O_5$ acting as oxidation catalyst are dispersed over the adsorbent, and the CeFO acting as structural promoter is also dispersed over the adsorbent.

Example 3

93.99 grams of water, 3.51 grams of glacial acetic acid and 17.21 grams of pseudo-boehmite are successively put into the stirring kettle, then the resultant mixture is stirred at high speed of 350 revolutions per minute for 30 minutes, so as to obtain alumina gel A. 26.51 grams of water and 6.09 grams of light magnesium oxide are successively put into the stirring kettle, then the mixture is evenly stirred for about 5 minutes, and then 18.12 grams of glacial acetic acid is slowly put into the mixture, and then the mixture is stirred at high speed of 350 revolutions per minute for 30 minutes, so as to obtain the magnesium slurry M1. 44.62 grams of water and 6.09 grams of light magnesium oxide are successively put into the stirring kettle, and then the mixture is evenly stirred, so as to obtain the magnesium slurry M2. 50% water solution is prepared respectively from 6.097 grams of $Fe(NO_3)_3 \cdot 9H_2O$ and 12 grams of hamartite powder. 1.029 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.90}Fe_{0.10}O_4 \cdot MgO$, the $CeO_2$ and $V_2O_5$ acting as oxidation catalyst are dispersed over the adsorbent, and the CeFO acting as structural promoter is also dispersed over the adsorbent.

Example 4

90.81 grams of water, 3.39 grams of glacial acetic acid and 16.62 grams of pseudo-boehmite are successively put into the stirring kettle, then the resultant mixture is stirred at high speed of 350 revolutions per minute for 30 minutes, so as to obtain alumina gel A. 26.30 grams of water and 6.04 grams of light magnesium oxide are successively put into the stirring kettle, then the mixture is evenly stirred for about 5 minutes, and then 17.98 grams of glacial acetic acid is slowly put into the mixture, and then the mixture is stirred at high speed of 350 revolutions per minute for 30 minutes, so as to obtain the magnesium slurry M1. 44.28 grams of water and 6.04 grams of light magnesium oxide are successively put into the stirring kettle, and then the mixture is evenly stirred, so as to obtain the magnesium slurry M2. 50% water solution is prepared respectively from 9.075 grams of $Fe(NO_3)_3 \cdot 9H_2O$ and 12 grams of hamartite powder. 1.029 grams of ammonium metavanadate is put into water with about 9 times of its weight, and then oxalic acid is put into this water solution until all the ammonium metavanadate is dissolved, so as to make 10% oxalic acid water solution of the ammonium metavanadate. said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.85}Fe_{0.15}O_4 \cdot MgO$, the $CeO_2$ and $V_2O_5$ acting as oxidation catalyst are dispersed over the adsorbent, and the CeFO acting as structural promoter is also dispersed over the adsorbent.

Example 5

87.68 grams of water, 3.27 grams of glacial acetic acid and 16.05 grams of pseudo-boehmite are put successively into the stirring kettle, then the resultant mixture is stirred at high speed of 350 revolutions per minute for 30 minutes, so as to obtain alumina gel A. 26.10 grams of water and 5.99 grams of light magnesium oxide are put successively into the stirring kettle, then the mixture is stirred evenly for about 5 minutes, and then glacial acetic acid of 17.84 grams is put slowly into the mixture, and then the mixture is stirred at high speed of 350 revolutions per minute for 30 minutes, so as to obtain the magnesium slurry M1. 43.94 grams of water and 5.99 grams of light magnesium oxide are successively put into the stirring kettle, and then the mixture is evenly stirred, so as to obtain the magnesium slurry M2. 50% water solution is prepared respectively from 12.008 grams of $Fe(NO_3)_3.9H_2O$ and 12 grams of hamartite powder. 1.029 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are put into the stirring kettle for mixing, and then the mixture is stirred at high speed of 350 revolutions per minute for 30 minutes. The obtained slurry is dried at the temperature of 120° C., and then calcined at the temperature of 500° C. for 80 minutes, so as to obtain the finished product of the trifunctional catalyst. In the trifunctional catalyst produced after calcining, the adsorbent component is $MgAl_{1.80}Fe_{0.20}O_4.MgO$, the $CeO_2$ and $V_2O_5$ acting as oxidation catalyst is dispersed over the adsorbent, the CeFO acting as structural promoter is also dispersed over the adsorbent.

Example 6

75.62 grams of water, 2.82 grams of glacial acetic acid and 13.84 grams of pseudo-boehmite are successively put into the stirring kettle, then the resultant mixture is stirred at high speed of 350 revolutions per minute for 30 minutes, so as to obtain alumina gel A. 25.32 grams of water and 5.81 grams of light magnesium oxide are successively put into the stirring kettle, then the mixture is evenly stirred for about 5 minutes, and then 17.31 grams of glacial acetic acid is slowly put into the mixture, and then the mixture is stirred at high speed of 350 revolutions per minute for 30 minutes, so as to obtain the magnesium slurry M1. 42.63 grams of water and 5.81 grams of light magnesium oxide are successively put into the stirring kettle, and then the mixture is evenly stirred, so as to obtain the magnesium slurry M2. 50% water solution is prepared respectively from 23.301 grams of $Fe(NO_3)_3.9H_2O$ and 12 grams of hamartite powder. 1.029 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.60}Fe_{0.40}O_4.MgO$, the $CeO_2$ and $V_2O_5$ acting as oxidation catalyst is dispersed over the adsorbent, and the CeFO acting as structural promoter is also dispersed over the adsorbent.

Example 7

84.41 grams of water, 4.54 grams of glacial acetic acid and 22.24 grams of pseudo-boehmite are successively put into the stirring kettle, then the resultant mixture is stirred at high speed of 350 revolutions per minute for 30 minutes, so as to obtain alumina gel A. 25.31 grams of water and 5.81 grams of light magnesium oxide are successively put into the stirring kettle, then the mixture is evenly stirred for about 5 minutes, and then 17.30 grams of glacial acetic acid is slowly put into the mixture, and then the mixture is stirred at high speed of 500 revolutions per minute for 30 minutes, so as to obtain the magnesium slurry M1. 42.61 grams of water and 5.81 grams of light magnesium oxide are successively put into the stirring kettle, and then the mixture is evenly stirred, so as to obtain the magnesium slurry M2. 50% water solution is prepared respectively from 13.447 grams of $Fe(NO_3)_3.9H_2O$ and 15 grams of hamartite powder. 1.607 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 500 revolutions per minute for 30 minutes. The obtained slurry is dried at the temperature of 120° C., and then calcined at the temperature of 500° C. for 80 minutes, so as to obtain the finished product of the trifunctional catalyst. In the trifunctional catalyst produced after calcining, the adsorbent component is $MgAl_{1.8}Fe_{0.2}O_4.0.4MgO$, the $CeO_2$ and $V_2O_5$ acting as oxidation catalyst is dispersed over the adsorbent, and the CeFO acting as structural promoter is also dispersed over the adsorbent.

Example 8

80.59 grams of water, 4.33 grams of glacial acetic acid and 21.23 grams of pseudo-boehmite are successively put into the stirring kettle, then the resultant mixture is stirred at high speed of 350 revolutions per minute for 30 minutes, so as to obtain alumina gel A. 27.62 grams of water and 6.34 grams of light magnesium oxide are successively put into the stirring kettle, then mixture is evenly stirred for about 5 minutes, and then 18.88 grams of glacial acetic acid is slowly put into the mixture, and then the mixture is stirred at high speed of 350 revolutions per minute for 30 minutes, so as to obtain the magnesium slurry M1. 46.49 grams of water and 6.34 grams of light magnesium oxide are successively put into the stirring kettle, and then the mixture is evenly stirred, so as to obtain the magnesium slurry M2. 50% water solution is prepared respectively from 12.950 grams of $Fe(NO_3)_3.9H_2O$ and 15 grams of hamartite powder. 1.607 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.8}Fe_{0.2}O_4.0.6MgO$, the $CeO_2$ and $V_2O_5$ acting as oxidation catalyst are dispersed over the adsorbent, the CeFO acting as structural promoter is also dispersed over the adsorbent.

Example 9

77.10 grams of water, 4.14 grams of glacial acetic acid and 20.31 grams of pseudo-boehmite are successively put into the stirring kettle, then the resultant mixture is stirred at high speed of 350 revolutions per minute for 30 minutes, so as to obtain the alumina gel A. 29.72 grams of water and 6.82 grams of light magnesium oxide are successively put into the stirring kettle, then the mixture is evenly stirred for about 5 minutes, and then 20.32 grams of glacial acetic acid is slowly put into the mixture, and then the mixture is stirred at high speed of 350 revolutions per minute for 30 minutes, so as to obtain the magnesium slurry M1. 50.04 grams of water and 6.82 grams of light magnesium oxide are successively put into the stirring kettle, and then the mixture is evenly stirred, so as to obtain the magnesium slurry M2. 50% water solution is prepared respectively from 12.489 grams of $Fe(NO_3)_3.9H_2O$ and 15 grams of hamartite powder. 1.607 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle, and then the mixture is stirred at high speed of 350 revolutions per minute for 30 Minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.8}Fe_{0.2}O_4.0.8MgO$, the $CeO_2$ and $V_2O_5$ acting as oxidation catalyst are dispersed over the adsorbent, and the CeFO acting as structure promoter is also dispersed over the adsorbent.

Example 10

73.90 grams of water, 3.97 grams of glacial acetic acid and 19.47 grams of pseudo-boehmite are successively put into the stirring kettle, then the resultant mixture is stirred at high speed of 350 revolutions per minute for 30 minutes, so as to obtain the alumina gel A. 31.65 grams of water and 7.27 grams of light magnesium oxide are successively put into the stirring kettle, then the mixture is evenly stirred for about 5 minutes, and then 21.64 grams of glacial acetic acid is slowly put into the mixture, and then the mixture is stirred at high speed of 350 revolutions per minute for 30 minutes, so as to obtain the magnesium slurry M1. 53.29 grams of water and 7.27 grams of light magnesium oxide are successively put into the stirring kettle, and then the mixture is evenly stirred, so as to obtain the magnesium slurry M2. 50% water solution is prepared respectively from 12.059 grams of $Fe(NO_3)_3.9H_2O$ and 15 grams of hamartite powder. 1.607 grams of ammonium metavanadate is put into water with about 9 times of its weight, and then oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 Minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.8}Fe_{0.2}O_4.MgO$, the $CeO_2$ and $V_2O_5$ acting as oxidation catalyst are dispersed over the adsorbent, the CeFO acting as structural promoter is also dispersed over the adsorbent.

Example 11

70.95 grams of water, 3.81 grams of glacial acetic acid and 18.69 grams of pseudo-boehmite are successively put into the stirring kettle, then the resultant mixture is stirred at a high speed of 350 revolutions per minute for 30 minutes, so as to obtain the alumina gel A. 33.43 grams of water and 7.68 grams of light magnesium oxide are successively put into the stirring kettle, then the mixture is evenly stirred for about 5 minutes, and then 22.85 grams of glacial acetic acid is slowly put into the mixture, and then the mixture is stirred at high speed of 350 revolutions per minute for 30 minutes, so as to obtain the magnesium slurry M1. 56.28 grams of water and 7.68 grams of light magnesium oxide are successively put into the stirring kettle, and then the mixture is evenly stirred, so as to obtain the magnesium slurry M2. 50% water solution is prepared respectively from 11.658 grams of $Fe(NO_3)_3.9H_2O$ and 15 grams of hamartite powder. 1.607 grams of ammonium metavanadate is put into water with about 9 times of its weight, and then the oxalic acid is put into this water solution until all the ammonium metavanadate is dissolved, so as to make 10% oxalic acid water solution of the ammonium metavanadate. Said alumina gel A, magnesium slurry M1, magnesium slurry M2, the water solution of ferric nitrate and hamartite, and the oxalic acid solution of ammonium metavanadate are successively put into the stirring kettle for mixing, and then the mixture is stirred at high speed of 350 revolutions per minute for 30 Minutes. The obtained slurry is dried at the temperature of 120° C., and then it is calcined at the temperature of 500° C. for 80 minutes, so as to obtain the finished product of the trifunctional catalyst. In the trifunctional catalyst produced after calcining, the adsorbent component is $MgAl_{1.8}Fe_{0.2}O_4.1.2\ MgO$, the $CeO_2$ and $V_2O_5$ acting as oxidation catalyst are dispersed over the adsorbent, the CeFO acting as structure promoter is also dispersed over the adsorbent.

The embodiments 1-11 are laboratory method for preparing the trifunctional catalyst (i.e., common drying method). When the method is applied, the content of hamartite with formulae of $(Ce,La)(CO_3)F$ contained in the hamartite powder is ≧93% (at weight), the content of rare-earth oxide in the hamartite powder is ≧70% (at weight), the rare-earth element composition in the rare earth oxide is Ce>>La, i.e., the Ce content greatly higher than the La content, Ce≧45% (at weight). As for the aluminum hydroxide gel solution produced by the reaction between pseudo-boehmite and monoprotonic acid, the acid number (the millimole number of monoprotonic acid corresponding to each grams of alumina $Al_2O_3$ in the system) is 3~5, the solid content is 15%~25%, the gelatinization rate of the used pseudo-boehmite is ≧95%, the content of $Al_2O_3.H_2O$ in the pseudo-boehmite is ≧70% (at weight). The specific surface area of the light magnesium oxide used for preparing the magnesium slurry M1 and magnesium slurry M2 is ≧100 $m^2/g$, the content of MgO is ≧95%.

The methods used for evaluating the samples of the trifunctional catalyst prepared in examples 1-11 in the laboratory are shown as follows:

Sulphur transfer evaluation: The experimental apparatus include the quartz tube reactor with inside diameter of 11 mm and fixed bed; 0.2 grams of sample is taken for evaluation. When the $SO_2$ adsorption evaluation is conducted, the total gas flow is 200 ml/min, in which the air flow is 40 ml/min ($O_2$ accounting for 4%), $SO_2$ flow is 2-4 ml/min (accounting for about 1%-2%), with $N_2$ as balance. The adsorption time is 30 min as a general rule, and the saturation adsorption is basically achieved at the temperature of 700° C. In the process of desorption, the desorption gas is $H_2$ with flow of 40 ml/min. The desorption time is 30 min, and the temperature is divided into two kinds, i.e. 540° C. and 700° C. The adsorption and desorption are circularly repeated in this way for more than 6 times, so as to determine the average $SO_2$ adsorption rate and average $SO_2$ desorption rate of the trifunctional catalyst under certain temperature and atmosphere condition, thereby judging the quality of the trifunctional catalyst. The higher the adsorption rate and desorption rate are, the better the performance of the trifunctional catalyst is.

According to the experiments conducted in laboratory under the identical condition on a kind of Canada trifunctional catalyst used for a refinery in Fujian, China, the saturation adsorption rate of the trifunctional catalyst for $SO_2$ is 45%.

$$\text{Adsorption rate} = \frac{\text{Weight increment of the sample}}{\text{The weight of the sample itself}} * 100\%$$

$$\text{Desorption rate} = \frac{\text{The reduced weight when resolving the sample having performed adsorption}}{\text{The weight increment of the sample in the adsorption process}} * 100\%$$

Nitrogen reduction and combustion promoting evaluation: The experimental apparatus include quartz tube reactor and ebullated bed. In the experiment, 3 gram of sample is taken for evaluation. When the evaluation on its combustion promoting effect on CO is conducted, the mixed gas comprises 10000 ppmv CO, 1% $O_2$ and balanced $N_2$. When the experiment on NOx degradation, the mixed gas include 10000 ppmv CO, 200 ppmv NO, 0.3% $O_2$ and balanced $N_2$. By determining the components after the gas reaction at the different temperatures, the conversion rate of the mixed gas can be known. Table 2 shows the corresponding temperatures of different samples when the conversion rates reach 50% and 90% respectively.

Table 1 shows the adsorption rates and desorption rates determined when sulphur transfer experiments are conducted on the samples obtained in embodiments 1-11.

TABLE 1

| | Example | | | | | |
|---|---|---|---|---|---|---|
| | 1 | 2 | 3 | 4 | 5 | 6 |
| Adsorption rate (%) | 63 | 68.9 | 69.5 | 69.6 | 63.1 | 64.7 |
| Desorption rate (%) | 101.5 | 102.6 | 101.7 | 104.2 | 101.9 | 98.5 |

TABLE 1-continued

| | Example | | | | |
|---|---|---|---|---|---|
| | 7 | 8 | 9 | 10 | 11 |
| Adsorption rate (%) | 66.1 | 66.0 | 69.7 | 75.0 | 73.5 |
| Desorption rate (%) | 98.1 | 100.8 | 102.2 | 102.3 | 101.8 |

Table 2 shows the temperatures respectively corresponding to the conversion rate of 50% or 90% determined when NOx and CO conversion tests are conducted on the samples obtained in embodiments 1-11.

TABLE 2

| | CO Combustion promoting experiment | | NO Degradation experiment | |
|---|---|---|---|---|
| Example | 50% Conversion temperature $T_{50}$ | 90% Conversion temperature $T_{90}$ | 50% Conversion temperature $T_{50}$ | 90% Conversion temperature $T_{90}$ |
| 1 | 395 | 475 | 447 | 481 |
| 2 | 378 | 455 | 425 | 460 |
| 3 | 367 | 445 | 419 | 451 |
| 4 | 360 | 440 | 410 | 445 |
| 5 | 390 | 472 | 445 | 480 |
| 6 | 384 | 467 | 436 | 472 |
| 7 | 380 | 455 | 431 | 465 |
| 8 | 382 | 451 | 427 | 471 |
| 9 | 363 | 440 | 417 | 453 |
| 10 | 342 | 415 | 403 | 439 |
| 11 | 350 | 428 | 412 | 447 |

Example 12 is the method for industrial production of the trifunctional catalyst, which is spray drying. The finished product of 50 Kg is taken as an example.

Example 12

73.90 Kilogramss of water, 3.97 Kilogramss of glacial acetic acid and 19.47 Kilogramss of pseudo-boehmite are successively put into the stirring kettle, then the mixture is stirred at high speed of 350 revolutions per minute for 30 minutes, so as to obtain the aluminum hydroxide gel A with gel solution acid value of 4 (the millimole number of monoprotonic acid corresponding each grams of alumina $Al_2O_3$) and solid content of 20%. The gelatinization rate of the adopted pseudo-boehmite is ≧95%; in the pseudo-boehmite, the content of $Al_2O_3 \cdot H_2O$ is ≧70% (at weight). 31.65 kilogramsss of water and 7.27 kilogramsss of light magnesium oxide are successively put into the stirring kettle and stirred for about 5 minutes, and then 21.64 kilogramsss of glacial acetic acid is slowly put into the mixture, and then the mixture is stirred at high speed of 350 revolutions per minute for 30 minutes, so as to obtain the magnesium slurry M1. 53.29 kilogramsss of water and 7.27 kilogramsss of light magnesium oxide are successively put into the stirring kettle, then the mixture is evenly stirred, so as to obtain the magnesium slurry M2. The specific surface area of the light magnesium oxide for forming the magnesium slurry M1 and M2 is ≧100 $m^2/g$, and the content of MgO is ≧95%. The 50% water solution is prepared respectively from 12.059 kilogramss of $Fe(NO_3)_3 \cdot 9H_2O$ and 15 kilogramss of hamartite powder. In said hamartite powder, the content of hamartite with chemical formula $(Ce,La)(CO_3)F$ is ≧93%; the content of the rare-earth oxide included in said hamartite powder ≧70% (at weight), and the rare-earth element composition in the rare earth oxide is Ce>>La, i.e., the Ce content is much higher than the La content, Ce≧45%(at weight). 1.607 kilogramss of the ammonium metavanadate is dissolved in the oxalic acid, so as to obtain 10% oxalic acid water solution of the ammonium metavanadate. The dosage of the oxalic acid is so limited as the ammonium metavanadate is entirely dissolved in water. Said alumina gel A, said magnesium slurry M1, said magnesium slurry M2, the water solution of ferric nitrate and hamartite, and the oxalic acid solution of ammonium metavanadate are successively put into the stirring kettle and stirred at a high speed of 350 revolutions per minute for 30 minutes. The obtained slurry is sprayed for drying at the temperature of 300° C., with pressure of 4 MPa, evaporation capacity of 50-150 Kg/h, the content of the part of semi-finished products with particle size distribution of 80-120 μm≧80% (at weight). Then, calcine the slurry at the temperature of 500° C. for 80 minutes, so as to obtain the finished product of the trifunctional catalyst. In the trifunctional catalyst obtained after calcining, the adsorbent component is $MgAl_{1.8}Fe_{0.2}O_4 \cdot MgO$, the $CeO_2$ and $V_2O_5$ acting as oxidation catalyst are dispersed over the adsorbent, and the CeFO acting as structural promoter is also dispersed over the adsorbent.

The trifunctional catalyst produced under the condition of this embodiment is applied in the petroleum catalytic cracking process. The case can be taken as a reference standard without adding any trifunctional catalyst. After the trifunctional catalyst of the present invention (with its reserve account for 2% of the total reserve) has been applied, compared with the reference standard, the content of sulfur dioxide in the flue gas at the outlet of the first stage regenerator is 0.33, so the first regenerator deprivation rate for sulfur dioxide of the trifunctional catalyst of the present invention is 67%; the trifunctional catalyst of the present invention has higher second regenerator deprivation rate for sulfur dioxide, which is 81%. Under the identical condition, the first regenerator deprivation rate for sulfur dioxide of the Canada trifunctional catalyst used in one finery in Fujian, China is 40%. The second regenerator NOx deprivation rate of the trifunctional catalyst of the present invention is 92%.

Figure 2:
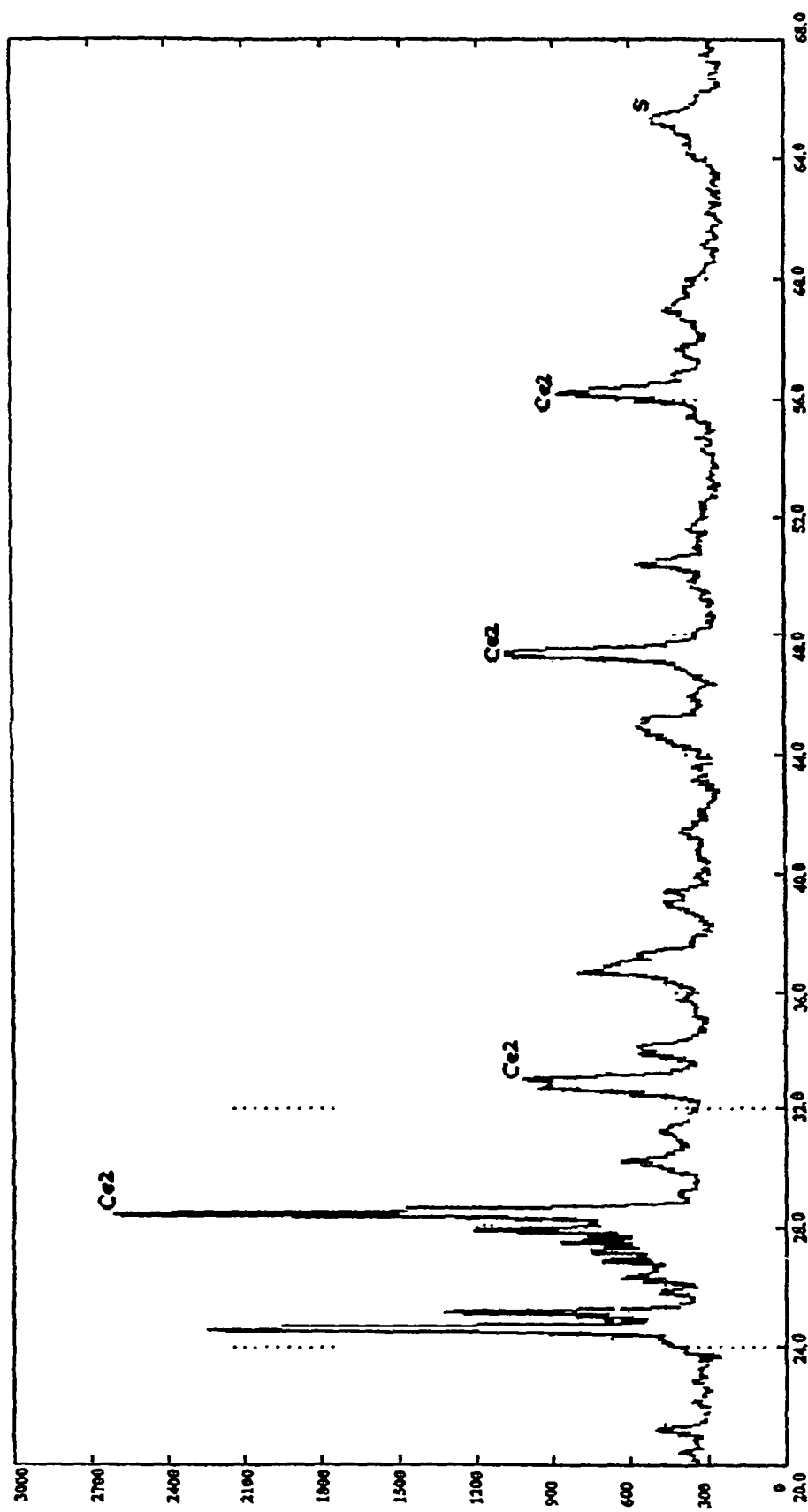
FIG. 2 is the X-ray diffraction pattern of the trifunctional catalyst of the present invention having adsorbed the SOx, where Ce2 represents the cerium dioxide, and S represents the spinel.

The X-ray diffraction pattern shown in FIG. 1 is obtained by conducting X-ray diffraction test on the trifunctional catalyst obtained in this embodiment. After having adsorbed $SO_2$ for 30 minutes according to the method for evaluating the trifunctional catalyst used by said laboratory, we obtained the X-ray diffraction pattern shown in FIG. 2. It can be known from said two diffraction patterns that: after the trifunctional catalyst has adsorbed $SO_2$, the characteristic peak of the eutectic crystal of cerium dioxide and cerium oxyfluoride disappears, and only the characteristic peak of cerium dioxide is left; the characteristic peak of magnesia disappears; the characteristic peak of spinel remains unchanged.

The invention claimed is:

1. A trifunctional catalyst for sulphur transfer, denitrogenation and combustion promoting, comprising an absorbent and an oxidative catalyst which is physically dispersed over the absorbent, wherein said oxidative catalyst is composed of cerium dioxide, cerium oxyfluoride, and vanadium pentoxide; the raw material for forming the cerium dioxide and cerium oxyfluoride is hamartite powder; and said absorbent is a spinel-like composite oxide having the following formula:

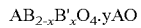

$$AB_{2-x}B'_xO_4 \cdot yAO$$

where A represents the alkaline-earth element Mg of periodic table of elements, B represents the group IIIA metallic element Al, B' represents the transition metallic element Fe, x represents 0.01-0.5, y represents 0.2-1.2, and the magnesium oxide exists in its free form;
wherein said cerium dioxide and cerium oxyfluoride combined represent 20%-35% of the weight of the trifunctional catalyst; and
wherein said vanadium pentoxide is 2%-4% of the weight of the trifunctional catalyst, and the rest of the trifunctional catalyst is absorbent.

2. The trifunctional catalyst of claim 1, characterized in that x represents 0.05-0.4, y represents 0.4-1.2.

3. The trifunctional catalyst of claim 2, characterized in that x represents 0.05-0.20, y represents 0.8-1.0.

4. The trifunctional catalyst of claim 1, characterized in that the components of the absorbent include $MgAl_{1.99}Fe_{0.01}O_4 \cdot MgO$, $MgAl_{1.95}Fe_{0.05}O_4 \cdot MgO$, $MgAl_{1.90}Fe_{0.10}O_4 \cdot MgO$, $MgAl_{1.85}Fe_{0.15}O_4 \cdot MgO$, $MgAl_{1.80}Fe_{0.20}O_4 \cdot MgO$, $MgAl_{1.60}Fe_{0.40}O_4 \cdot MgO$, $MgAl_{1.80}Fe_{0.20}O_4 \cdot 0.4MgO$, $MgAl_{1.80}Fe_{0.20}O_4 \cdot 0.6MgO$, $MgAl_{1.80}Fe_{0.20}O_4 \cdot 0.8MgO$, $MgAl_{1.80}Fe_{0.20}O_4 \cdot 1.0MgO$ or $MgAl_{1.80}Fe_{0.20}O_4 \cdot 1.2MgO$.

5. The trifunctional catalyst of claim 1, characterized in that: the raw material for forming the vanadium pentoxide in the oxidative catalyst is ammonium metavanadate.

6. A method for preparing the trifunctional catalyst for sulphur transfer, denitrogenation and combustion promoting as claimed in claim 1 comprises the following steps:
   1) To stir and mix said hamartite powder with water for obtaining the suspension of hamartite powder for ready-use; to mix ammonium metavanadate with water and organic acid for obtaining the organic acid water solution of ammonium metavanadate for ready-use; to stir the hydrate of alumina with water and monoprotonic acid for obtaining aluminum hydroxide gel for ready-use; to stir the light magnesium oxide with water and monoprotonic acid for obtaining the slurry of magnesium salt for ready-use; to stir the light magnesium oxide with water for obtaining the slurry of magnesium hydroxide for ready-use; to dissolve the ferric iron salt in water for obtaining the water solution of ferric iron for ready-use; wherein the dosage of hamartite powder is so determined as the chemical compounds containing the rare-earth cerium in the finished product accounting for 20%-35% of the total weight of the finished product; the dosage of ammonium metavanadate is so determined as the vanadium pentoxide in the finished product accounting for 2%-4% of the total weight of the finished product; the dosage of hydrate of alumina, light magnesium oxide and ferric iron salt is so determined as the required chemical composition of $AB_{2-x}B'_xO_4 \cdot yAO$ and the absorbent in the finished product accounting for 61%-78% of the total weight of the finished product;
   2) To mix the aluminum hydroxide gel, the slurry of magnesium salt, the slurry of magnesium hydroxide, the suspension of hamartite powder, the organic acid solution of ammonium metavanadate and the solution of ferric iron salt obtained in step 1), so as to obtain a mixed liquor;
   3) To dry said mixed liquor for obtaining the semi-finished product; and
   4) To calcine the semi-finished product at the temperature of 400-800° C. for 1-2 hours, for obtaining the finished product.

7. The method for preparing the trifunctional catalyst for sulphur transfer, denitrogenation and combustion promoting of claim 6, characterized in that: in the hamartite powder of step 1), the content of hamartite having a chemical formula $(Ce,La)(CO_3)F$ is ≧93% (at weight); the content of rare-earth oxide included in said hamartite powder is ≧70% (at weight), and the rare-earth element composition in the rare earth oxide is Ce>>La, i.e., the Ce content greatly higher than the La content, Ce≧45% (at weight).

8. The method for preparing the trifunctional catalyst for sulphur transfer, denitrogenation and combustion promoting of claim 6, characterized in that: the organic acid mixed with ammonium metavanadate in step 1) is oxalic acid, the lower limit of the dosage of said oxalic acid is so defined as the ammonium metavanadate can be entirely dissolved in water.

9. The method for preparing the trifunctional catalyst for sulphur transfer, denitrogenation and combustion promoting of claim 6, characterized in that: the hydrate of alumina is pseudo-boehmite, and, in step 1), through the reaction occurred between pseudo-boehmite and monoprotonic acid, a aluminum hydroxide gel having gel solution acid value of 2-6 and solid content of 15%-25% (at weight) is obtained, wherein the gelatinization ratio of the pseudo-boehmite is 95%, the content of $Al_2O_3.H_2O$ in said pseudo-boehmite is ≧70% (at weight), said monoprotonic acid is nitric acid or acetic acid.

10. The method for preparing the trifunctional catalyst for sulphur transfer, denitrogenation and combustion promoting of claim 9, characterized in that: when said pseudo-boehmite and monoprotonic acid are mixed in step 1), the stirring rate reaches 300-600 revolutions per minute.

11. The method for preparing the trifunctional catalyst for sulphur transfer, denitrogenation and combustion promoting of claim 9, characterized in that: said monoprotonic acid is nitric acid with gel solution acid value of 3-5.

12. The method for preparing the trifunctional catalyst for sulphur transfer, denitrogenation and combustion promoting of claim 6, characterized in that: as for the light magnesium oxide used for preparing said slurry of magnesium salt and said slurry of magnesium hydroxide in step 1), the specific surface area is ≧100 $m^2/g$, and the content of MgO is ≧95% (at weight); said monoprotonic acid used for preparing said slurry of magnesium salt is acetic acid and/or nitric acid; the dosage of said acetic acid and/or nitric acid is determined according to the mole ratio for its sufficient reaction with MgO; the solid content of said slurry of magnesium salt and said slurry of magnesium hydroxide is 10%~14% (at weight).

13. The method for preparing the trifunctional catalyst for sulphur transfer, denitrogenation and combustion promoting of claim 12, characterized in that: to prepare said slurry of magnesium salt in step 1), said light magnesium oxide is at first stirred with water evenly, and then glacial acetic acid and/or nitric acid is added to magnesia for conducting sufficient reaction, so as to produce magnesium acetate and/or magnesium nitrate; when said glacial acetic acid and/or nitric acid is reacted with magnesia, the stirring rate reaches 300-600 revolutions per minute.

14. The method for preparing the trifunctional catalyst for sulphur transfer, denitrogenation and combustion promoting of claim 6, characterized in that: the ferric iron salt used in step 1) is ferric nitrate.

15. The method for preparing the trifunctional catalyst for sulphur transfer, denitrogenation and combustion promoting of claim 6, characterized in that: when mixing is performed in step 2), the stirring rate reaches 300-600 revolutions per minute.

16. The method for preparing the trifunctional catalyst for sulphur transfer, denitrogenation and combustion promoting of claim 6, characterized in that: the drying process in step 3) is spray drying, with temperature of 300-350° C., pressure of 3.0-5.0Mpa, evaporation capacity of 50-150 kg/h, and the content of the part of the semi-finished product with particle size distribution within the range of 80~120 μm≧80% (at weight).

17. The method for preparing the trifunctional catalyst for sulphur transfer, denitrogenation and combustion promoting of claim 6, characterized in that: the drying process in step 3) is oven drying, with temperature of 100-150° C.

18. The method for preparing the trifunctional catalyst for sulphur transfer, denitrogenation and combustion promoting of claim 6, characterized in that: in the calcining process in step 4), a method of slow heating-up is adopted, with calcining temperature of 400~500° C. and calcining time of 80-100 minutes.

\* \* \* \* \*